United States Patent

Clauss et al.

[11] Patent Number: 5,759,403
[45] Date of Patent: Jun. 2, 1998

[54] METHOD FOR PURIFYING WASTE WATER USING ACTIVATED SLUDE TO INCREASE PURIFICATION YIELDS

[75] Inventors: Frédéric Clauss, Toulouse, France; Norbert Wamser; Manfred Hangl, both of Graz, Austria; Harald Trooper, Ligist, Austria; Bernard Capdeville, deceased, late of Toulouse, France, by Martine Capdeville, Stéphanie Capdeville, legal representatives

[73] Assignee: Naintsch Mineralwerke Gessellschaft M.B.H., Graz, Austria

[21] Appl. No.: 507,390

[22] PCT Filed: Mar. 10, 1994

[86] PCT No.: PCT/EP94/00813

§ 371 Date: May 29, 1996

§ 102(e) Date: May 29, 1996

[87] PCT Pub. No.: WO94/20425

PCT Pub. Date: Sep. 15, 1994

[30] Foreign Application Priority Data

Mar. 11, 1993 [AT] Austria ............................. 481/93
Oct. 25, 1993 [FR] France ........................... 93 12791

[51] Int. Cl.⁶ .......................................................... C02F 3/12
[52] U.S. Cl. ..................................... 210/616; 210/626
[58] Field of Search ................................. 210/615, 616, 210/617, 618, 623, 626, 150, 151

[56] References Cited

U.S. PATENT DOCUMENTS

| | | | |
|---|---|---|---|
| 3,928,191 | 12/1975 | Belusco | 210/616 |
| 3,968,036 | 7/1976 | Liles et al. | 210/616 |
| 4,069,148 | 1/1978 | Hutton et al. | 210/616 |
| 4,221,657 | 9/1980 | Lebesgue | 210/616 |
| 4,332,693 | 6/1982 | Piepho | 210/767 |
| 4,772,307 | 9/1988 | Kiss et al. | 210/616 |
| 5,143,847 | 9/1992 | Kawase et al. | 210/617 |
| 5,192,441 | 3/1993 | Sibony et al. | 210/616 |
| 5,569,634 | 10/1996 | Miller et al. | 210/617 |

FOREIGN PATENT DOCUMENTS

| | | |
|---|---|---|
| 394030B | 1/1992 | Austria . |
| 21378 | 1/1981 | European Pat. Off. . |
| 0117586 | 9/1984 | European Pat. Off. . |
| 175568 | 3/1986 | European Pat. Off. . |
| 55-86586 | 6/1980 | Japan . |
| 4-235793 | 8/1992 | Japan . |

OTHER PUBLICATIONS

Chemical Abstracts, vol. 81, No. 20, Nov. 18, 1974, Abstract No. 126470u.
Chemical Abstracts, vol. 102, No. 4, Jan. 28, 1985, Abstract No. 31409u.
Database WPI, Week 9240, Derwent Publications Ltd., London, GB; AN 92-328060 & JP, A,4 253 793.
Patent Abstracts of Japan, vol. 14, No. 509, Nov. 7, 1990, pp. 96 C 776 & JP.A,02 211 292.
Database WPI, Week 8815, Derwent Publications Ltd., London, GB; AN 88-102016 & JP.A. 63 051 993.

*Primary Examiner*—Christopher Upton
*Attorney, Agent, or Firm*—Shlesinger Arkwright & Garvey LLP

[57] ABSTRACT

The invention concerns a process for increasing the purification yield in the activation tank of a station for the purification of waste waters employing the so-called "activated sludge" process. According to the invention, talc, pyrophyllite, kaolin or mica, possibly cationized, are added to the biomass, these having a particle size less than 100 μm in quantities of up to 2.0 g per liter of waste waters. A great improvement in solid/liquid separation is observed at the outlet from the activation tank as well as an increase in the purification yield for carbonaceous pollution, nitrogenous pollution and phosphate-containing pollution even when the station operates at medium or high load.

6 Claims, 1 Drawing Sheet

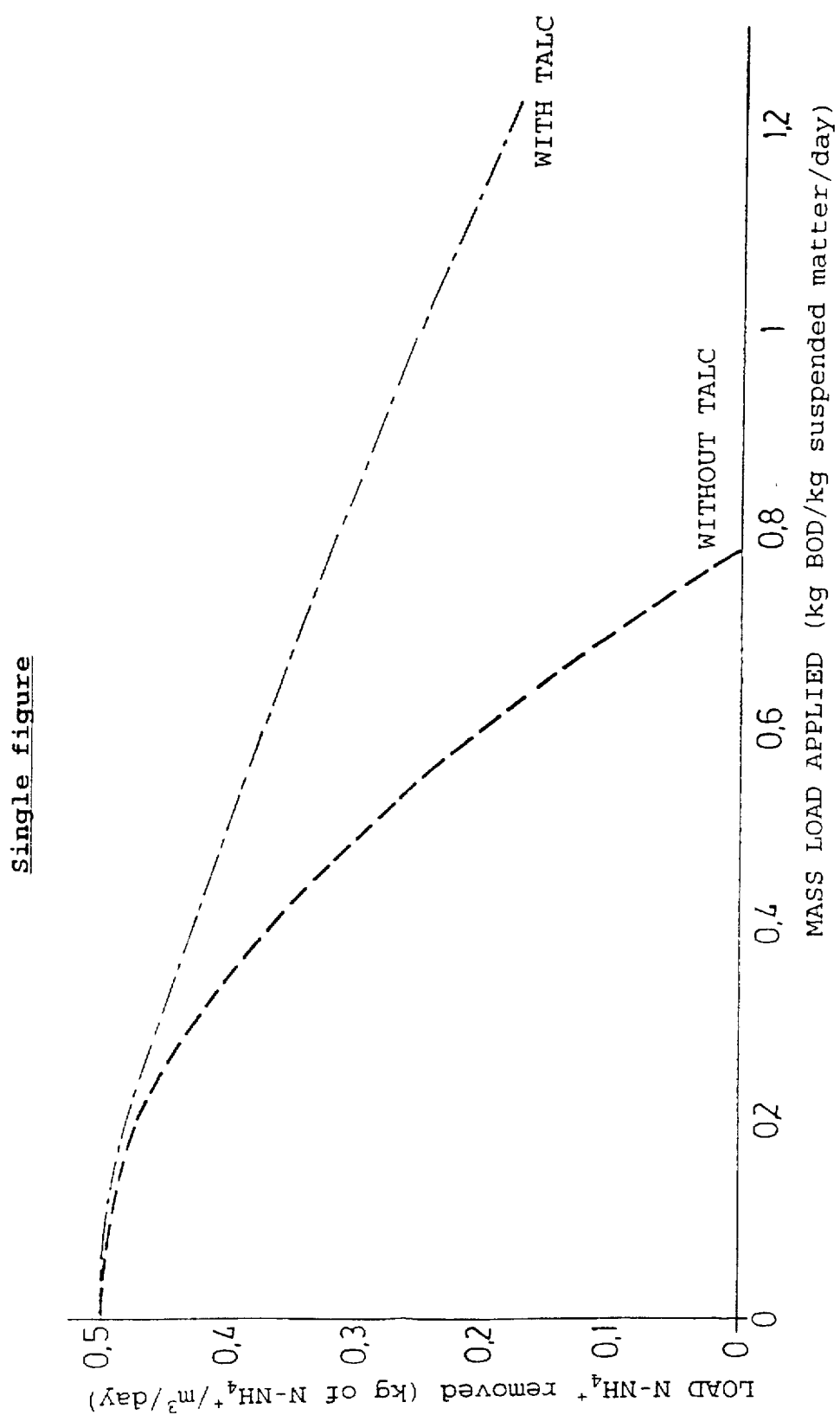

METHOD FOR PURIFYING WASTE WATER USING ACTIVATED SLUDE TO INCREASE PURIFICATION YIELDS

The invention concerns a process for the purification of waste waters by biological means, of the so-called "activated sludge" type.

During the biological purification of waste waters by the activated sludge process, a process used in more than 60% of public purification stations in the developed world, waste waters that are often previously freed from sand and degreased are led (sometimes via a pre-separator) into the activation tank where biological degradation is carried out by bacteria. This activation tank is aerated at least during certain cycles in order to enable aerobic bacteria to develop, essentially with the aim of removing carbonaceous impurities. This tank can also be subjected to non-aerated cycles for the development of anaerobic bacteria also with the aim of degrading nitrates and it is also possible to provide a second non-aerated tank for the development of anaerobic bacteria. The bacteria or micro-organisms form flocs with a density close to that of water (called "activated sludges") and the purified waste waters are separated from these flocs by density difference, conventionally by gravity in a post-separator (generally called a "clarifier" or "secondary separator" which will from now on be called a "separator"). The purified water can then be directly discharged to the river.

Sludges collected at the base of the separator are partially led again to the activation tank so as to maintain a large number of purifying micro-organisms. Excess sludges are withdrawn and then treated separately so as to reduce their volume and mass, with a view to agricultural use or to be discharged as a sediment.

Operators of stations for the biological purification of waste waters by activated sludges are confronted with two main difficulties:

1) Maintenance of a sufficient concentration of purifying micro-organisms in the activation tank in contact with the water to be treated.

If, by the physico-chemical composition of the waters entering the station, the bacteria which develop in the medium associate in filamentous flocs which settle very little (40% of stations in Europe), the separation of water/purifying micro-organisms is very difficult to achieve. The separator can no longer play its part in the clarification of the treated water and the supernatant which is directed to the river contains many purifying micro-organisms. The activation tank is then regularly washed and gradually becomes empty of purifying micro-organisms, thus leading to a halt in the purification of used waters.

2) Nitrification of the ammonium ions of the effluent to be treated since, on the one hand, ammonium ions which constitute the greater part of the nitrogenous pollution are very toxic, and on the other hand, nitrification of ammonia is the limiting stage in the removal of nitrogenous nutrients responsible in part for the problems of eutrophication of large and small rivers and lakes.

When the quantities of waste waters to be purified are greater than the treatment capacity of the station (so-called "medium or heavy load" stations, signifying that the pollution to be treated is very large in relation to the quantity of purifying micro-organisms present in the activation tank), the operator can no longer recirculate the sludges coming from the separator tank through a lack of volume capacity in the installation. It is for example the case in stations purifying waste waters from towns with an increasing population. Activated sludges are then almost totally removed from the purifying system. It follows that the quantity of micro-organisms degrading the carbonaceous pollution in the activating tank is very low and that there is a total absence of micro-organisms degrading the nitrogenous pollution, the latter not being present in "young" sludges, that is to say in sludges which have not been held for a very long time in the station. The carbonaceous pollution entering the station is thus only slightly degraded while the nitrogenous pollution is not degraded at all.

Few solutions exist for maintaining a sufficient concentration of purifying micro-organisms (often referred to as a "biomass") in the activation tank, and/or for introducing nitrogen-fixing bacteria which are indispensable for the elimination of nitrogenous pollution (particularly $NH_4^+$ and/or $NO_3^-$). In the case of a station in under-capacity (quantities of water to be treated greater than the treatment capacity), the only solution consists of increasing the size of activation tanks (or changing the process). This extension to the station is very costly and sometimes impossible when the station is situated in an urban area where there is a lack of available ground space.

Moreover, low concentrations of purifying micro-organisms lead to a very low yield from the final phases in the removal of nitrates and make it necessary to increase considerably the size of the installations or to provide auxiliary tanks for removing this type of pollution.

The object of the present invention is to provide a process which enables, on the one hand, an increase in concentration of the purifying biomass to be obtained in the activation tank and a better control of this concentration to be achieved, and on the other hand, an increase in the activity of the bacteria present to achieved, even when the activated sludges are present in the form of filaments difficult to separate from the treated water, and even when the amount of sludge purged from the separator is high on account of the undercapacity of the station to treat incoming effluents. This increase in the concentration and activity of the active biomass first of all concerns micro-organisms which degrade carbonaceous pollution. Due to the increase in the residence time of micro-organisms in the activation tank, it also concerns micro-organisms which oxidise and degrade ammoniacal pollution. The improved process aimed at by the invention thus enables a reduction to be achieved in the discharge of organic material into the activation tank, it also concerns micro-organisms which oxidise and degrade ammoniacal pollution. The improved process aimed at by the invention thus enables a reduction to be achieved in the discharge of organic material into rivers as well as removal of toxic ammonium ions for the same degree of civil engineering construction. Moreover, the increase in the activity of bacteria results in an increased consumption of phosphates and hence in an increased degree of removal of phosphate containing pollution.

For this purpose, the process of the invention is of the so-called activated sludge type, wherein waste waters containing carbonaceous pollution and/or nitrogenous pollution and/or phoshate-containing pollution in an activation tank are put into contact with a biomass composed of purifying micro-organisms, the treated water is separated from activated sludge in a separator, and a fraction of the activated sludge is recycled to the activation tank. According to the present invention, a talc or pyrophyllite or mica powder, with the exclusion of any organic binder, is mixed with the biomass, under conditions such that the mineral grains and bacteria are put directly into contact, in order to encourage the formation of composite flocs consisting of mineral grains of talc, pyrophyllite, or mica enclosed in a bacterial matrix and directly attached to this, the activated sludges formed by the said mixed flocs of mineral grains/bacteria having a density greater than that of water and being partially recycled continuously so as to increase the concentration of micro-organisms in the activation tank and the residence time of the said micro-organisms in the said tank.

The term "separator" is intended to mean any static or dynamic system, encouraging solid/liquid separation by means of density differences, such as a gravity settling tank, hydrocyclones etc.

In the process of the invention, it has been possible to observe that when the grains of talc, pyrophyllite or mica powder come into contact with micro-organisms, mixed flocs form by a trapping effect of the powder grains in the bacterial flocs. This effect is unexpected by reason of the high physico-chemical inertia characteristics, non-porosity and small specific area of the abovementioned powders. The effect obtained is all the more unexpected in that talc, pyrophyllite and mica have a well known lipophilic character which gives them an adsorbing power for greases and would lead one to expect a complete absence of affinity for bacteria (such an affinity generally being associated with materials of a hydrophilic nature). The above-mentioned effect of the formation of mixed flocs is very marked and up to now it has not been possible to explain it. When the quantity of talc, pyrophyllite or mica powder is between 0.01 g/l and 2.0 g/l of waste waters, it is noted that practically all the grains of powder and all the micro-organisms are assembled in a multitude of mixed flocs of the abovementioned type.

The size of talc, pyrophyllite or mica particles used is advantageously less than 100 μm. In a particularly advantageous embodiment of the process according to the invention, the size of the talc, pyrophyllite or mica particles used is between 3 and 50 μm.

"Talc" is intended to mean hydrated magnesium silicate of the formula $3MgO.4SiO_2.H_2O$ or any mixture of phyllosilicate containing this compound. "Pyrophyllite" is intended to mean hydrated aluminium silicate of the formula $Al_2O_3.4SiO_2.H_2O$, sometimes also known as "Agalmatolite" or any silicate mixture containing this compound. "Mica" is intended to mean aluminium micas such as muscovites of the formula $6SiO_2.3Al_2O_3.K_2O.2H_2O$, magnesium micas such as phlogopites of the formula $6SiO_2.Al_2O_3.6MgO.K_2O.2H_2O$, as well as aluminium or magnesium illites derived from the preceding minerals by variable substitutions of Al for Si on the one hand and Fe for Al or Mg on the other hand. In all cases, these natural species may contain associated minerals.

The mixed flocs formed by the process according to the invention have a higher density than that of simple bacterial flocs by reason of the density of the powder grains, of the order of 2.5 to 3 times greater than those of aggregates of micro-organisms which usually form in an aqueous medium. This high density enables rapid densification of activated sludges to be obtained during successive recycling, which allows good separation of these to take place in the separator in a permanent operational phase. It should be noted that separation is greatly encouraged when the separator is a hydrocyclone. The technique of hydrocycloning which has the advantage of resulting in compact devices suitable for the possible treatment of odours, is currently only used to a limited extent since the differences in density between bacterial flocs and water are often very small and, on account of this, cut-off thresholds are very difficult to maintain. In all cases, recirculation of purifying micro-organisms from the separator to the activation tank is very largely encouraged, even if the bacteria are in the form of filaments (which usually come together in bacterial flocs that settle with great difficulty). Moreover, this improved recirculation of activated sludges increases the residence time of purifying micro-organisms, enabling nitrifying bacteria to become established in a surprising way, even in so-called "medium or high load" stations. It has also been noted that, for an equal weight of micro-organisms, increased bacterial activity occurs when these are agglomerated into mixed micro-organism/powder grain flocs (compared with the activity of purely bacterial flocs), this effect also being unexplained. This increase in activity (measured by oxygen consumption in the medium) results in an increased consumption of phosphate. It should be noted that the aforementioned powders are chemically neutral and are not soluble in waste waters when they are added to these (which avoids loading waters with new pollution).

A variant of the process according to the invention consists of using cationized talc, pyrophyllite or mica powders. It involves talc, pyrophyllite or mica powders treated with various cationic agents. As a cationic agent, compounds can be used for example such as anines based on epichlorhydrin, quaternary aliphatic polyamines etc. The use of cationized talc, pyrophyllite or mica enables densification of activated sludges to be obtained, exceeding those reached with the same non-treated mineral powders.

Powders acting as additives can also be introduced, according to the process of the invention, both before the pre-separation tank as well as directly into the activation tank. It is also possible to introduce talc, pyrophyllite or mica into the recirculation circuit for activated sludges between the separator and the activation tank or in the separator (whether conventionally or not, dynamically or statically) where it will act directly on the densification of sludges. It has been demonstrated that addition of talc, pyrophyllite, or mica powder directly to the activation tank is particularly effective for rapidly increasing the concentration of micro-organisms. Addition of these powders to the separator is particularly effective in the case of filamentous bacteria so as to avoid washing the latter.

The following examples are intended to illustrate the process of the invention. All these examples are carried out with waste waters drawn off at the outlet of a primary separator of a conventional type receiving a hydraulic charge corresponding to an ascending rate of the order of 0.5 m/h, with the exception of examples 8 and 9.

Examples 1 to 7 were carried out in a pilot station comprising (downstream from this primary separator):

a cylindrical activation tank with a volume of 3.5l, supplied at a rate of 1.5l/h and continuously oxygenated and agitated (adjustment of the concentration of oxygen in the medium to 5 mg/l).

a cylindro-conical separator with a volume of 3l, the conical base of which is connected, on the one hand, by a pipe for recycling sludges to the activation tank, and on the other hand connected to an extraction pump.

a system for introducing mineral powder into the activation tank (or for examples 4, 5 and 6 into the separator), comprising a reservoir of powder in suspension in water and a pump for injecting this suspension, enabling the quantity of suspension to be adjusted and thus the quantity of powder introduced into the activation tank (or into the separator).

Examples 1, 2 and 3 on the one hand, and examples 4, 5 and 6 on the other hand, were carried out simultaneously on three installations identical to that described previously and referred to as the "pilot installation". Example 7 was carried out in this pilot installation, the single figure of drawings illustrating the results obtained in this example 7.

EXAMPLE 1

Stabilization of a purification station by activated sludges operating conventionally, by introducing talc powder.

This example was carried out in three successive phases:

First phase

Duration: 35 days of conventional operation in order to define the purifying properties of the installation.

Second phase:

Duration: 35 days of operation with 0.15 g of talc/litre of waste waters to be treated, introduced continuously into the activation tank. This phase enabled the effect of talc on the purifying properties of the installation to be demonstrated.

Third phase:

Duration: 45 days of conventional operation, introduction of talc being discontinued at the start of this phase. This phase ensured that the effect noted in phase 2 was indeed due to the addition of talc and not derived from the operation of the installation, and that in the absence of talc, the installation purified to the same level as during phase 1. This phase was longer than the preceding ones, since about a week was needed to remove the talc completely from the installation.

Three parameters were measured each day during the three successive phases, and their means and standard deviations measured for each phase of the study

- the chemical oxygen demand for all the effluent (total COD, expressed in mg $O_2/l$), characteristic of the concentration of carbonaceous pollution, measured at the inlet of the activation tank and at the outlet from the separator (the reduction in total COD was thus calculated, the first characteristic of the purifying performances of the installation),
- the chemical oxygen demand for the soluble fraction of the effluent (soluble COD, expressed in mg $O_2/l$), characteristic of the concentration of soluble carbonaceous pollution, measured at the inlet of the activation tank and at the outlet from the separator (the reduction in soluble COD was thus calculated, the second characteristic of the purifying performance of the installation),
- the Mohlmann index, expressed by the volume occupied by the activated sludges allowed to settle for 30 minutes, in relation to the mass of suspended matter of the said activated sludges (MI in ml/g) (the smaller this index, the easier the separation of bacterial flocs/purified water).

The talc powder used was sold by TALC DE LUZENAC (France), under the reference "LUZENAC MB 30". It consisted of 55% hydrated magnesium silicate and 45% hydrated magnesium aluminium silicate. 75% of particles had an equivalent spherical diameter less than 11 µm, 50% less than 6.3 µm and 25% less than 3.5 µm.

|  | Total COD (mg/l) | | | Soluble COD (mg/l) | | | M.I. | |
|---|---|---|---|---|---|---|---|---|
|  | $V_s$ | $E_t$ | $A_b$ | $V_s$ | $E_t$ | $A_b$ | V | $E_t$ |
| Phase 1 | 105 | 37 | 224 | 52 | 26 | 89 | 128 | 101 |
| Phase 2 | 98 | 17 | 256 | 43 | 18 | 123 | 51 | 15 |
| Phase 3 | 110 | 25 | 190 | 56 | 22 | 74 | 100 | 28 |

$V_s$ = outlet value,
$E_t$ = standard deviation,
$A_b$ = reduction,
V = value of index.

The effect of talc on the Mohlmann index was spectacular (ability to separate solid/liquid), as well as on the consistency of the outlet values, characterized by very low standard deviations. Not only did talc enable a better mean purification to be obtained, but its quality was very consistent.

The effect of talc on the treatment of pollution, both total and soluble, was undeniable.

EXAMPLE 2

Stabilization of a purification station by activated sludges operating conventionally, by introducing mica powder.

The phases of the studies and the parameters measured were identical to those described in example 1. The mica powder was added at a rate of 1.0 g/l of water to be treated.

The mica powder used was sold by KAOLINS d'ARVOR (France) under the reference "MICARVOR 20". It consisted of 55% mica, 30% kaolinite and 15% feldspars. 75% of particles had an equivalent spherical diameter less than 7.4 µm, 50% less than 4.1 µm and 25% less than 1.9 µm.

|  | Total COD (mg/l) | | | Soluble COD (mg/l) | | | M.I. | |
|---|---|---|---|---|---|---|---|---|
|  | $V_s$ | $E_t$ | $A_b$ | $V_s$ | $E_t$ | $A_b$ | V | $E_t$ |
| Phase 1 | 105 | 37 | 224 | 52 | 26 | 89 | 128 | 101 |
| Phase 2 | 100 | 22 | 254 | 48 | 22 | 118 | 86 | 26 |
| Phase 3 | 110 | 25 | 190 | 56 | 22 | 74 | 100 | 28 |

$V_s$ = outlet value,
$E_t$ = standard deviation,
$A_b$ = reduction,
V = value of index.

The use of mica powder thus enabled an improvement to be obtained in the removal of carbonaceous pollution, an improvement in the consistency of this removal as well as an improvement in the separation of activated sludges/purified water.

EXAMPLE 3

Putting a station into conformity which had been out of order due to the presence of filamentous bacteria, by introducing talc powder.

This example was carried out in four successive phases:

First phase

Duration: 10 days of operation during which the pilot installation was supplied by the same type of waste waters as those used in examples 1, 2 or 3, to which 1.5 g of glucose were added per litre of water to be treated. Glucose is an easily biodegradable pollutant, which encourages the development of filamentous bacteria. After the first five days, purification was completely disturbed: the separator was filled with suspended matter, there was no longer any solid/liquid separation and the bacteria were expelled from the pilot installation.

Second phase:

Duration: 3 days of operation with 2 g of talc/litre of waste water to be treated +1.5 g of glucose per litre of water to be treated, introduced continuously into the separator. After these three days, sludge recirculation was once again possible.

Third phase:

Duration: 27 days of operation with 0.15 g of talc/litre of waste waters to be treated +1.5 g of glucose per litre of water, introduced continuously into the separator. A reduction in the quantity of talc was possible since the second phase rapidly enabled the installation to be managed normally.

Fourth phase:

Duration: 15 days of operation without talc, with only the mixture of waste waters+glucose (1.5 g/l). About a week was needed to remove the talc completely from the installation.

The parameters measured were identical to those described in example 1.

The talc used was "Luzenac MB30", used and described in example 1.

|  | Total COD (mg/l) | | | Soluble COD (mg/l) | | | M.I. | |
|---|---|---|---|---|---|---|---|---|
|  | $V_s$ | $E_t$ | $A_b$ | $V_s$ | $E_t$ | $A_b$ | V | $E_t$ |
| Phase 1 | 1202 | 1675 | 167 | 186 | 149 | 310 | 499 | 421 |
| Phases 2 & 3 | 108 | 77 | 1795 | 70 | 48 | 505 | 205 | 98 |
| Phase 4 | 1150 | 1590 | 190 | 173 | 133 | 320 | 510 | 470 |

$V_s$ = outlet value,
$E_t$ = standard deviation,
$A_b$ = reduction,
V = value of index.

The effect of talc was spectacular. It enabled the value of the total COD at the outlet from the installation to be brought down below the standard of 125 mg/l.

Reduction in the three purifying characteristics of the installation was very rapid and very large during phases 2 and 3. However, observation of bacterial flocs under the optical microscope indicated that the ecology of the system had not been altered, filamentous bacteria still being present in the system although their harmful effects on solid/liquid separation were no longer noticed since these bacteria enclosed by winding round the talc to form dense mixed flocs.

During the fourth phase (discontinuation of talc), the problems reappeared as the talc was removed (via sludge purges), until they became insoluble when all the talc was removed. Consequently, the installation could no longer purify waste waters satisfactorily.

EXAMPLE 4

Putting a station into conformity which had been out of order due to the presence of filamentous bacteria, by introducing mica powder.

The phases of the studies and the parameters measured were identical to those described in example 1.

The mica powder used was that described in example 3.

|  | Total COD (mg/l) | | | Soluble COD (mg/l) | | | M.I. | |
|---|---|---|---|---|---|---|---|---|
|  | $V_s$ | $E_t$ | $A_b$ | $V_s$ | $E_t$ | $A_b$ | V | $E_t$ |
| Phase 1 | 1202 | 1675 | 167 | 186 | 149 | 310 | 499 | 421 |
| Phases 2 & 3 | 127 | 101 | 1776 | 84 | 51 | 491 | 250 | 110 |
| Phase 4 | 1197 | 1605 | 143 | 181 | 138 | 312 | 525 | 478 |

$V_s$ = outlet value,
$E_t$ = standard deviation,
$A_b$ = reduction,
V = value of index.

The use of mica powder thus enabled the installation to operate satisfactorily, in spite of the presence of filamentous bacteria. The use of mica did not alter the ecology of the system.

EXAMPLE 5

Nitrification at constant temperature by adding talc powder.

Example 5 was carried out in the pilot installation already described. In order to study the influence of talc powder additions on the nitrification of ammonium ions, all the pilot installation was kept at 15° C. by means of a thermostat (nitrification depends enormously on temperature, and a difference of a few degrees alters the reaction kinetics enormously).

Since the nitrification reaction also depends on the mass load applied to the installation, it was studied with and without talc, while varying this. This was obtained by altering the hydraulic conditions of the installation.

The results obtained are illustrated by the curves 1 and 2 of the single figure of drawings, showing changes in the quantity of ammonium ions removed from the installation (N-NH$_4^+$ load eliminated, expressed in kg of N-NH$_4^+$/m$^3$/day) as a function of the ratio of the quantity of carbonaceous pollution entering the installation to the quantity of micro-organisms present in the activation tank (mass load applied, expressed in kg BOD/kg suspended matter/day).

The talc powder used was that used in example 1, in the same quantities (0.15 g/l of water to be treated).

The curves 1 and 2 show unambiguously that, due to the addition of talc, it is possible to remove large quantities of ammonium ions, even at a high or very high load, whereas this removal is very limited or impossible without talc.

EXAMPLE 6

Putting a public purification station into conformity by addition of talc powder.

Example 6 was carried out on a purification station with a capacity of 1000 inhabitant-equivalent treating between 600 and 700 m$^3$/day. The nominal capacity was only 300 m$^3$/day. This station, situated in Styrie (Austria), was subjected to low temperatures, during experimentation the temperature being stabilized around 10° C. At this low temperature, the nitrification kinetics were considerably retarded and ammonium degradation could not take place.

The purification station had available an effluent pretreatment unit (screen, sand catcher and degreaser). The effluent was then allowed to settle for about 2 hours before being returned to the activation tank. Separation of bacterial flocs from the purified water was carried out in a secondary separator of a conventional type.

This example was carried out in three successive phases:

First phase:

Duration: 20 days of conventional operation.

Mean temperature: 15° C.

Second phase:

Duration: 35 days of operation with about 0.20 g of talc/1 of waste waters to be treated. The talc powder, which was difficult to wet, was pre-wetted by water entering the activation tank in an Archimedean screw, before being introduced continuously into the activation tank.

Mean temperature: 10° C.

Third phase:

Duration: 45 days of conventional operation, introduction of talc powder being discontinued at the start of this phase. About ten days were needed to remove talc powder from the station.

Mean temperature: 10° C.

The talc powder used was sold by the Naintsch Mineral Werke Company (Austria) under the reference "Biosorb 30".

It consisted of 55% hydrated magnesium silicate and 45% hydrated magnesium aluminium silicate. 75% of particles had an equivalent spherical diameter less than 12 µm, 50% less than 6.7 µm and 25% less than 3.4 µm.

During the three successive phases, the many pollution indices for the water discharged were measured daily:

chemical oxygen demand of all the effluent (total COD, in mg/l), concentration of ammonium ions in the effluent as nitrogen (N-NH$_4$, in mg/l), concentration of nitrate ions in the effluent as nitrogen (N-NO$_3$, in mg/l), concentration of orthophosphate ions in the effluent as phosphorus (P-oPO$_4$, in mg/l).

|  | Total COD (mg/l) | N—NH$_4$ (mg/l) | N—NO$_3$ (mg/l) | P-oPO$_4$ (mg/l) |
| --- | --- | --- | --- | --- |
| Stage 1 | 102 | 28.5 | 12.5 | 1.3 |
| Stage 2 | 43 | 2.5 | 5.2 | 0.9 |
| Stage 3 | 112 | 33.0 | 14.3 | 1.5 |

Mean values at the outlet of the installation of the principal pollution indicators of the water.

These values may be translated into a reduction due to the talc:

|  | Total COD | N—NH$_4$ | N—NO$_3$ | P-oPO$_4$ |
| --- | --- | --- | --- | --- |
| Talc effect | 60% | 90% | 60% | 35% |

Reduction in pollution due to talc, compared with periods without talc.

The effects of talc were spectacular and unexpected. The very positive influence of the use of talc powder on the removal of carbonaceous pollution (COD) and ammoniacal pollution (NH$_4^+$) already observed in pilot installations was found here again. The very positive influence of the use of talc powder on the removal of nitrates and phosphates had not been anticipated, since all the tests carried out in the laboratory were on almost perfect pilot installations. In particular, the activation tanks of these pilot installations were completely aerated. In fact, denitrification could not be observed. Now, in a real station, the ability to agitate and aerate is not homogeneous over all the volumes and "anoxic" zones exist, that is to say non-aerated zones where only a little denitrification is conventionally possible. This unexpected effect of the additive according to the invention may be explained by "protection" by the talc powder of purifying organisms present in the medium and/or a concentration effect of nitrifying bacteria due to the presence of talc powder. Indeed, "sludge respiration" measurements carried out on conventional flocs and mixed flocs indicated that mixed flocs consumed oxygen in the activation tank two to three times more rapidly than conventional flocs.

This indicated that bacterial activity was much greater and could explain the increased consumption of phosphorus by bacteria, as well as more thorough degradation of ammonium, nitrates and carbonaceous pollution.

EXAMPLE 7

Densification of activated sludges by sedimentation in the presence of various additives.

In this example, densification of activated sludges alone and sludges mixed with calcium carbonate or cationic agents alone, was compared with that observed after addition of talc, cationized talc or mica according to the invention.

The activated sludges came from the public purification station where the experiments described in example 6 were carried out. They contained 4.1 g of dry matter per litre of activated sludge.

The following mineral materials, cationized or not, were added to a litre of the said activated sludges over 10 minutes:

a) 0.5 g of "Biosorb 30", the talc described and used in example 6, b) 0.5 g of "Biosorb 30", treated with 0.7% by weight of "Percol"® sold by Allied Colloid (GB), an amine based on epichlorhydrin, c) 0.0035 g of "Percol"®, that is the quantity added in b), d) 0.5 g of "Biosorb 30" treated with 0.7% by weight of "Superfloc"® (sold by the American Cyanamid Corporation (New Jersey - U.S.A.)), a quaternary aliphatic polyamine, e) 0.0035 g of "Superfloc"®, that is the quantity added in d), f) 0.5 g of "20B", kaolin, g) 0.5 g of "Micarvor 20", the mica described and used in examples 3 and 6, h) 0.5 g of "Hydrocarb 5", a calcium carbonate sold by the OMYA Company (Switzerland), i) 0.5 g of "HTM 20", a pyrophyllite sold by MINERAC AO MATHEUSS LEME Ltda (BRAZIL). This pyrophyllite was more than 95% pure. 75% of particles had an equivalent spherical diameter of less than 9 µm, 50% less than 5 µm and 25% less than 2.6 µm.

The mixtures thus obtained, as well as a reference consisting of activated sludges alone (Ref.), were introduced into graduated test tubes and the volume of sludges settled were noted after 30 minutes of settling.

|  | Ref | a | b | c | d | e | f | g | h | i |
| --- | --- | --- | --- | --- | --- | --- | --- | --- | --- | --- |
| Volume after 30 min (ml) | 790 | 470 | 410 | 750 | 380 | 750 | 670 | 630 | 750 | 460 |
| Reduction in volume compared with reference | — | 40% | 48% | 5% | 52% | 5% | 15% | 20% | 5% | 42% |

These results show unambiguously the important part played by talc, pyrophyllite and mica powders on the sedimentation of activated sludges, as well as the synergy that exists between cationic agents and these activated powders, talcs in particular. It will be noted that chemical additives employed alone, as well as calcium carbonate, have little influence on the process.

We claim:

1. An activated sludge waste water treatment process providing improved purification yields for at least one of carbonaceous, nitrogenous and phosphate pollutants in the waste water, the process comprising the steps of:

a) providing a biomass having purifying microorganisms therein for treating a waste water;

b) intermixing a hydrophobic mineral powder selected from the group consisting of talc, pyropyllite and mica with a biomass having purifying microorganisms therein to provide a composite floc containing a microorganism matrix enclosed mineral;

c) contacting in an activation chamber the waste water to be treated with the biomass for a period of time sufficient to produce an activated sludge having a density greater than water;

d) separating the activated sludge from the waste water in a separator; and e) recycling the activated sludge containing the composite flocs within the activation chamber to selectively control at least one of the concentration and residence time of the purifying microorganisms therein.

2. Process according to claim 1, wherein a talc, pyrophyllite or mica powder is used consisting of particles with a size less than 100 µm.

3. Process according to claim 2, wherein a talc, pyrophyllite or mica powder is used consisting of particles with a size of between 3 and 50 µm.

4. Process according to one of claim 1, wherein between 0.01 and 2.0 g of talc, pyrophyllite or mica powder are mixed per litre of waste water to be treated entering the activation tank.

5. Process according to claim 1, wherein a cationized talc, pyrophyllite or mica powder is used.

6. The process of claim 1 and wherein:

a) the biomass intermixed with the hydrophobic mineral powder is the separated activated sludge.

* * * * *